3,010,963
QUATERNARY HYDROXYALKYL TERTIARY HETEROCYCLIC AMINE BASES AND SALTS

William E. Erner, Wilmington, Del., assignor to Houdry Process Corporation, Wilmington, Del., a corporation of Delaware
No Drawing. Filed May 21, 1959, Ser. No. 814,691
4 Claims. (Cl. 260—268)

This invention is concerned with quaternary hydroxyalkyl bases of diazabicyclo-octane and imidazole, their salts, and the synthesis thereof.

Many varieties of quaternary nitrogen compounds have been and are continually being prepared because of the value of the materials in themselves and as starting materials in the synthesis of other organic compounds. The compounds herein considered are new in the field of quaternary compounds and are effective in many uses including inhibition of the action of certain enzymes; deterrence in the growth of non-chlorophyll containing plant life; inhibition of the growth of micro-organisms such as bacteria; useful catalysts of the tertiary amine or quaternary ammonium type, e.g., in catalyzing polyurethane foams and precursors of compounds in which the quaternary structure coupled with the unique hydroxyalkyl structure of these compounds is particularly advantageous.

In accordance with this invention quaternary hydroxyalkyl derivatives of diazabicyclo-octane and imidazole are prepared by the reaction thereof with an alkylene oxide in the presence of water at temperatures in the range of 20–100° C., pressure of from 0.5 to 10 atmospheres and for times in excess of 15 minutes and less than 12 hours. Salts of the quaternary hydroxide are further prepared by reaction with acids, including both mineral acids and organic acids.

This concept is indicated by the following general equations

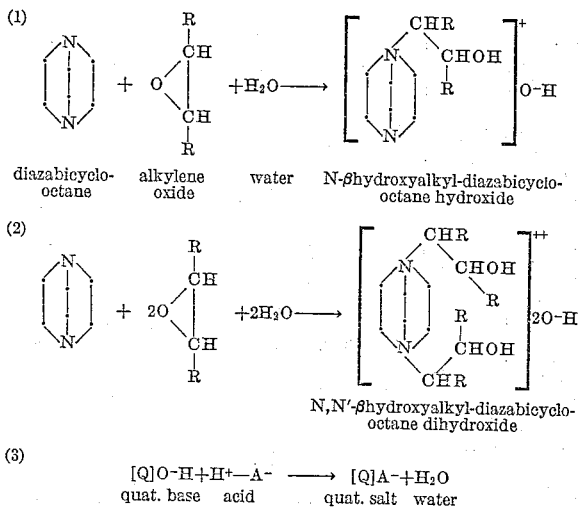

alkyl group of from one to a maximum of 10 carbon atoms per mol. The quaternary ammonium mono- (1) or dihydroxide (2) is a strong base neutralizable with acids. $H^+$—$A^-$ is an acid having an $H^+$ ion, and $A^-$ the salt-forming anionic portion of the acid. $H^+$—$A^-$ may be an inorganic acid such as H—$OSO_3H$, H—$ONO_2$, H—$OPO_2$, HCl, etc., or an organic acid such as H—OOC—$CH_3$, acetic acid; H—O—$C_6H_5$, carbolic; HOOC—$C_6H_5$, benzoic, etc.

The alkylene oxides suitable for this reaction range from ethylene oxide through the normally gaseous and liquid alkylene oxides to at most the $C_{10}$ compounds. Inasmuch as the reaction is at least molar with regard to the tertiary heterocyclic amine and the alkylene oxide and bimolar to polymolar with regard to the alkylene oxide, since alkylene oxides are polymerizable, the quantities of reactants employed are at least molar with respect to the product desired. In order to facilitate the reaction, which is preferably conducted in an aqueous medium, at least 3 mols of water are employed per mol of tertiary heterocyclic amine in the reaction system.

The following examples are embodiments of the types of materials considered in this inventive concept:

EXAMPLE I

One mol (112 grams) of diazabicyclo-octane was dissolved in 60 ml. of water and 60 ml. of methanol. 82 g. of butylene oxide (a mixture of the 1,2- and 2,3-epoxides of butane) were added dropwise with stirring while maintaining a temperature of 25–35° C. for one hour. Stirring was continued overnight. Titration of a portion of the product to a phenolphthalein end-point with 0.1 N hydrochloric acid indicated 79% of theoretical formation of N-(dimethyl-beta hydroxyethyl)-diazabicyclo-octane hydroxide. The reaction product was dried in a rotary evaporatory for 8 hours and then kept under vacuum for about 70 hours. The resultant quaternary hydroxide of N-(dimethyl-beta hydroxyethyl)-diazabicyclo-octane weighed 245 gms. and was a honey-colored, highly viscous liquid. The diagrammatic representation below shows the type of reaction evolved.

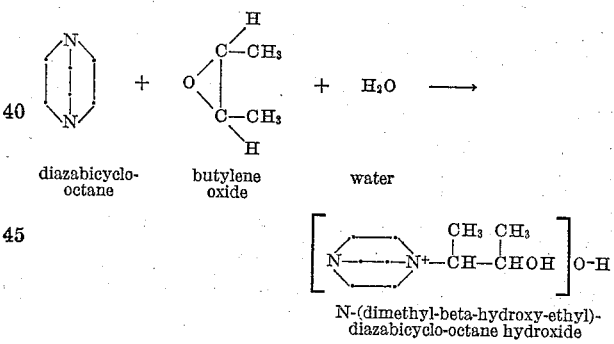

EXAMPLE II

One mol of diazabicyclo-octane was dissolved in 3 mols of water and then reacted with propylene oxide at approximately room temperature using step-wise addition of propylene oxide. Equimolar reaction of diazabicyclo-octane, water and propylene oxide was substantially complete within the hour. Continued contact with an excess of propylene oxide effected further reaction with additional amounts of propylene oxide. After 1½ hours reaction was continuing as shown by 1.52 equivalents of O—H titratable based on the formation of the dihydroxide. When the reaction appeared to be in equilibrium there was the equivalent of about 84% of theoretical formation of the N,N'-bis-hydroxypropyl diazabicyclo-octane dihydroxide.

After removal of the excess water and unreacted propylene oxide by evaporation, the product was reacted with amounts of sulfuric acid equivalent to the anionic hydroxyl component and an amount of nonanoic acid equivalent to (esterification) the alkanol hydroxyls in the cationic complex with the temperature being brought up to 140–150° C. for 1½ hours. The product was the sulfate salt of the dinonanoic ester. The course of the reaction is diagrammatically illustrated below.

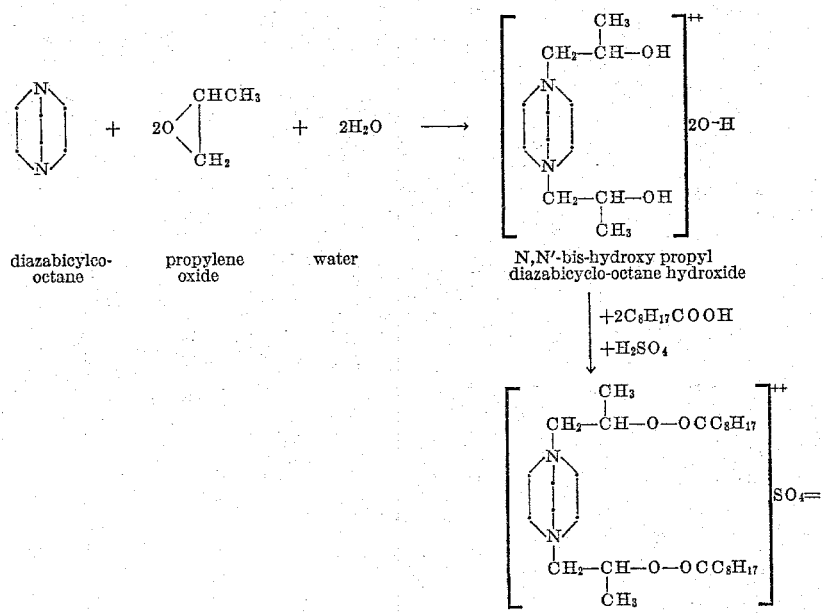

EXAMPLE III

Two mols of diazabicyclo-octane were dissolved in 600 ml. of water and in a reactor fitted with a cold condenser and dropping funnel, propylene oxide was added at 22–30° C. as follows: 110 ml. in 30 minutes, 205 ml. in 55 minutes to a total of 280 ml. in 75 minutes. After 120 minutes, titration indicated the reaction was 77% complete and 925 ml. of N,N′-bis-hydroxy propyl diazabicyclo-octane dihydroxide was recovered. Portions of the product were treated as in Example II to obtain the following salts of several indicated acids, namely: sulfuric, cresylic, salicylic and phosphoric, with the corresponding salts isolated individually by evaporation.

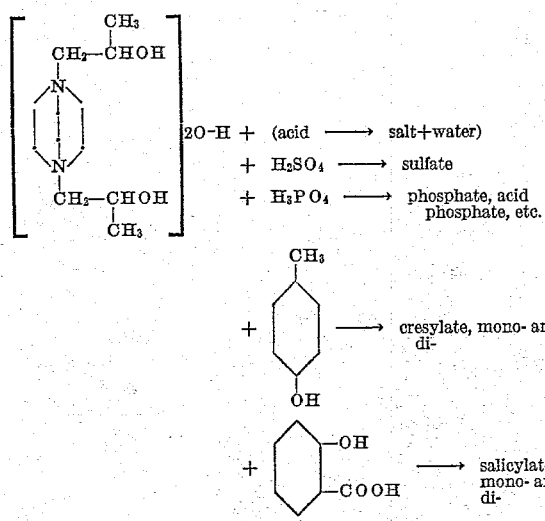

The salts of sulfuric and phosphoric acids were found to have a powerful inhibitory action on the growth of yeast in sugar solution, on the growth of mol in starch solution and upon the formation of lactic acid (growth of lactobacilli) in homogenized milk.

EXAMPLE IV

Two mols of diazabicyclo-octane were dissolved in 600 ml. of water and admixed with 4 mols (223 ml.) of propylene oxide by step-wise addition over a ¾ hour period. The reactor was cooled externally with ice and the temperature was held in the range of 35–50° C. and at atmospheric pressure. After 3.5 hours, titration of reactor samples with sulfuric acid to the phenolphthalein endpoint indicated the degree of completion of the reaction to be 87.5% of theory. The product was separated as in Example I and recovered. Two portions were then converted by treatment with phosphoric acid and acetic acid to the acid phosphate and acetate salts respectively. The acetic acid salt was further dehydrated by heating in vacuum and then reacted with acetic anhydride, thereby esterifying the "internal" hydroxyl groups. There was some simultaneous decomposition during the esterification reaction with resultant aldol formation.

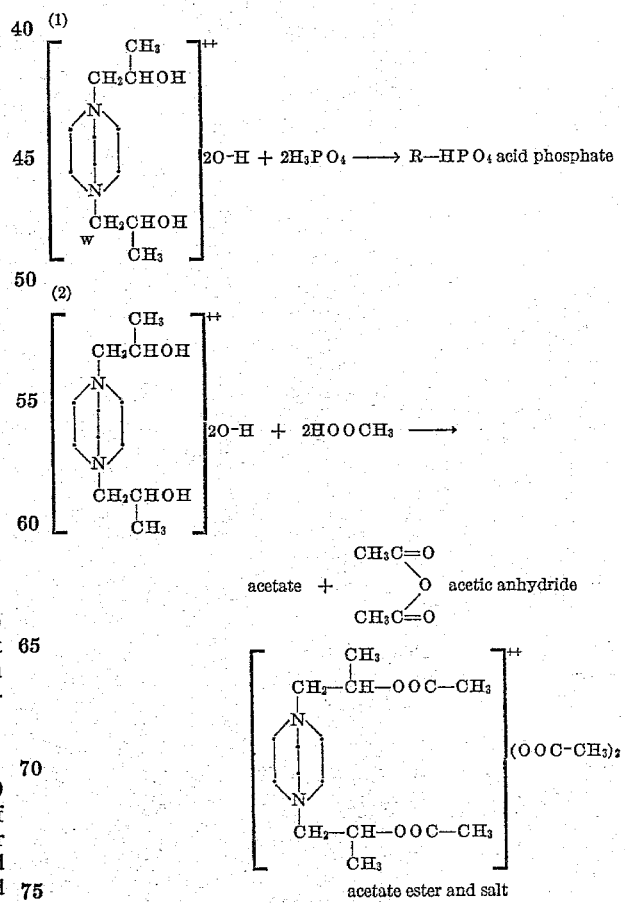

EXAMPLE V

Reaction products of 2 mols of propylene oxide and 1 mol of diazabicyclo-octane prepared as in Example II were converted respectively to the chloride and fluoride salts by reaction of the dihydroxide with hydrochloric and hydrofluoric acid respectively, with subsequent evaporation of water:

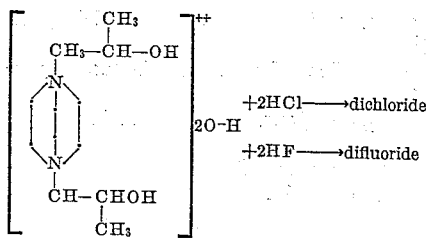

EXAMPLE VI

One mol of diazabicyclo-octane dissolved in 3 mols of water is reacted with an excess of hexylene-2,3-epoxide (2,3-epoxy hexane). The product after removal of the excess water is a dark brown, viscous, semi-liquid at room temperature, being the dihydroxide of N,N'-(2-hexane-3-ol) diazabicyclo-octane.

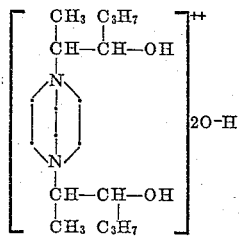

EXAMPLE VII 8.2 grams 2-methyl imidazole (0.1 mol) in 16.5 grams water were treated with 12.0 grams of propylene oxide (0.2+ mol) in small increments with gradual heating to 70° C. until the propylene oxide had reacted. The product was then reacted with 7.3 grams of 83% acetic acid (0.1 mol) to form the acetate salt. This salt was tested as a polymerization promoter in polyurethane foam forming reactions. An activator solution was made comprising an aqueous solution of the above quaternary hydroxy propyl imidazole acetate, diazabicyclo-octane, and X520 silicone oil, a product of Union Carbide Chemical Company, for use in catalyzing the production of foamed polyurethanes from hydroxy polyethers and tolylene diisocyanates.

*Polyurethane foams catalyzed with DABCO[1] and quaternary imidazole acetate*

| Foam Run # | 1 | 2 |
|---|---|---|
| LG-56, hydroxy polyether | 300 | 300. |
| TD-80, tolylene diisocyanates | 110 | 110. |
| Water | 8.7 | 8.7. |
| DABCO[1] | 1.2 | 0.6. |
| Quaternary imidazole acetate | 1.2 | 1.2. |
| X520, silicone | 2.9 | 2.9. |
| Mixing time, seconds | 10 | 10. |
| Time to cream, seconds | 24 | 18. |
| Total foam time, seconds to maximum rise | 134 | 92. |
| Description | Stable foam, good resiliency, little shrinkage on curing. | Slight shrinkage on curing. |

[1] DABCO=Trademark term for diazabicyclo-octane (Houdry).

EXAMPLE VIII

The reaction of alkylene oxides with imidazole and diazabicyclo-octane, as illustrated above by propylene oxide, is applicable as well to reactive epoxides, such as 9,10-epoxy stearic acid.

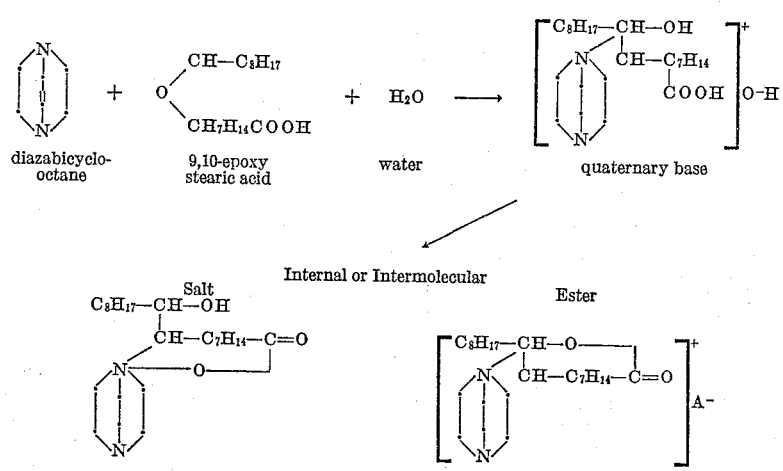

The epoxide may be also a functional moiety of an ester, alcohol or carbonyl compound.

It is to be understood that imidazole may be employed in the type of reactions above illustrated with diazabicyclo-octane to obtain products with an imidazole nucleus.

Obviously many modifications and variations of the invention hereinbefore set forth may be made without departing from the spirit and scope thereof and therefore only such limitations should be imposed as are indicated in the appended claims.

What is claimed is:

1. The process for the preparation of hydroxyalkyl quaternary base derivatives of 1,4-diazabicyclo-(2.2.2)-octane which consists of preparing a mixture consisting essentially of an alkylene oxide having at least two but less than twenty-three carbon atoms per molecule, 1,4-diazabicyclo-(2.2.2)-octane and water, subjecting said mixture to a pressure within the range from 0.5 to 10 atmospheres for a time in excess of fifteen minutes and no more than twelve hours at a temperature in the range from 20 to 100° C. and recovering the quaternary base hydroxyalkylene 1,4-diazabicyclo-(2.2.2)-octane from the reaction mixture.

2. The process of claim 1 wherein said alkylene oxide is present in at least bimolar relation to said diazabicyclo-octane and said water is present in at least trimolar relation to said diazabicyclo-octane.

3. The quaternary base compound having the formula

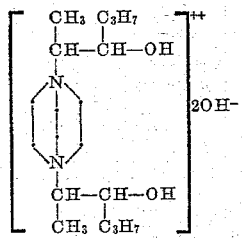

4. The quaternary base compound of the formula:

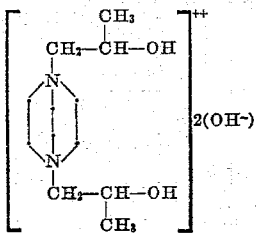

References Cited in the file of this patent

UNITED STATES PATENTS 2,800,487 Mark _____ July 23, 1957
2,891,025 Price _____ June 16, 1959

OTHER REFERENCES

Hromatka: Chemische Berichte, vol. 75, pages 1302–1310 (1942).

Mann et al.: Jour. Chem. Soc. (London), pages 4476–4480 (1954).

McElvain et al.: Jour. Amer. Chem. Soc., vol. 76, pages 1126–1129 (1954).

Giesemann: Journal für praktische Chemie, vol. 4, pages 169–176 (1956).

UNITED STATES PATENT OFFICE
CERTIFICATE OF CORRECTION

Patent No. 3,010,963                  November 28, 1961

William E. Erner

It is hereby certified that error appears in the above numbered patent requiring correction and that the said Letters Patent should read as corrected below.

Column 1, line 43, end of the equation, line 52, end of the equation, line 58, beginning of the equation, column 2, line 46, end of the equation, column 2, line 61, after "of", first occurrence, columns 3 and 4, line 8, end of first portion of the equation, column 3, line 47, column 4, lines 45 and 56, column 5, lines 13 and 55, and column 6, line 30, after the bracket, for "O-H", each occurrence, read -- $OH^-$ --; column 1, line 52, the second portion of formula (2) should appear as shown below instead of in the patent:

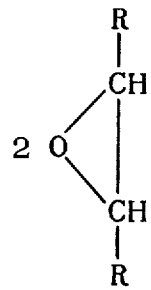

column 2, line 44, insert the positive charge -- + --, at the upper right of the last bracket; column 3, line 7, the formula of propylene oxide and its value should read as shown below instead of as in the patent:

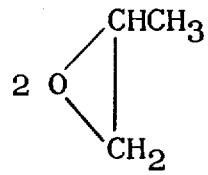

same column 3, line 43, upper right of the last bracket, insert the double positive charge -- ++ --; column 3, line 66, for "mol" read -- mold --; column 4, line 48, strike out "w" in the bracket formula; column 4, line 57, for "2HOOCH$_3$" read -- 2 HOOCCH$_3$ --; column 4, line 70, for "(OOC-CH$_3$)$_2$" read -- (OOCCH$_3$)$_2$ --; column 5, line 30, for

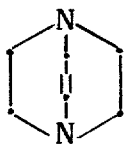     read     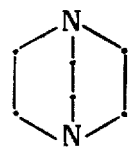

3,010,963 column 6, line 27, within the bracket, the quaternary nitrogen should be attached as shown below instead of as in the patent:

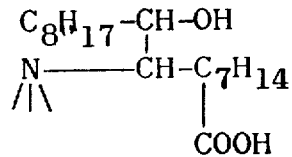

column 6, lines 30 to 32, the triangular epoxide structure should appear as shown below instead of as in the patent:

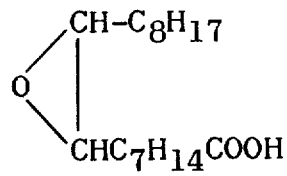

same column 6, line 41, the partial formula should appear as shown below instead of as in the patent:

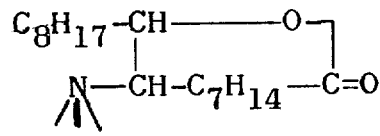

column 7, line 6, for "2OH-" read -- 2 OH⁻ --.

Signed and sealed this 25th day of June 1963.

(SEAL)
Attest:

ERNEST W. SWIDER
Attesting Officer

DAVID L. LADD
Commissioner of Patents